United States Patent
Lapeyre et al.

(10) Patent No.: US 8,303,970 B2
(45) Date of Patent: Nov. 6, 2012

(54) POLYAMIDE-BASED POWDER AND ITS USE FOR OBTAINING AN ANTIBACTERIAL COATING

(75) Inventors: Adrien Lapeyre, Evreux (FR); Christian Gancet, Lons (FR)

(73) Assignee: Arkema France, Colombes (FR)

( * ) Notice: Subject to any disclaimer, the term of this patent is extended or adjusted under 35 U.S.C. 154(b) by 106 days.

(21) Appl. No.: 12/761,089

(22) Filed: Apr. 15, 2010

(65) Prior Publication Data
US 2010/0316795 A1      Dec. 16, 2010

Related U.S. Application Data

(62) Division of application No. 11/001,922, filed on Dec. 2, 2004, now abandoned.

(60) Provisional application No. 60/540,482, filed on Jan. 30, 2004.

(30) Foreign Application Priority Data

Dec. 5, 2003 (FR) ..................... 03 14305

(51) Int. Cl.
*A01N 25/00* (2006.01)
*A01N 25/12* (2006.01)
*A61K 9/48* (2006.01)
*A61K 47/30* (2006.01)
*A61K 33/38* (2006.01)
*A61K 9/14* (2006.01)

(52) U.S. Cl. ........ 424/405; 424/489; 424/501; 424/618; 514/772.3

(58) Field of Classification Search ................ None
See application file for complete search history.

(56) References Cited

U.S. PATENT DOCUMENTS

| | | | |
|---|---|---|---|
| 4,938,958 A | 7/1990 | Niira et al. | |
| 5,980,620 A | 11/1999 | Brodie et al. | |
| 6,093,407 A | 7/2000 | Cummings et al. | |
| 6,129,782 A | 10/2000 | Brodie et al. | |
| 6,432,416 B1 | 8/2002 | Cummings et al. | |
| 6,858,257 B1 * | 2/2005 | Cordiner | 427/385.5 |
| 2003/0096017 A1 | 5/2003 | Decker et al. | |

FOREIGN PATENT DOCUMENTS

| | | |
|---|---|---|
| JP | 06025561 | 1/1994 |
| JP | 2001-247726 | 11/2001 |
| WO | WO 01/90259 | 11/2001 |

* cited by examiner

*Primary Examiner* — Ernst Arnold
(74) *Attorney, Agent, or Firm* — RatnerPrestia

(57) ABSTRACT

The present invention relates to a method of covering a metal article with a film formed from the melting of a thin layer of powder comprising: physically blending 99.8 to 97% by weight of at least one polyamide and 0.2 to 3% by weight of an inorganic biocide species consisting of a soluble ceramic in which silver ions are encapsulated to form a powder blend composition; contacting the metal article with said powder composition blend to form a thin layer of said powder on the article; melting the powder blend composition onto the metal article to form a thin coating film; and cooling the coated article; where the powder blend composition is free of zinc compounds.

10 Claims, No Drawings

POLYAMIDE-BASED POWDER AND ITS USE FOR OBTAINING AN ANTIBACTERIAL COATING

This application is a divisional application of U.S. Ser. No. 11/001,922 filed Dec. 2, 2004, now abandoned, and claims benefit, under U.S.C. §119(a) of French National Application Number 03.14305, filed Dec. 5, 2003; and also claims benefit, under U.S.C. §119(e) of U.S. provisional application 60/540,482, filed Jan. 30, 2004, all applications incorporated herein by reference.

FIELD OF THE INVENTION

The present invention relates to a polyamide-based powder and its use for coating articles. It is useful in processes for covering an article with a film formed from the melting of a thin layer of powder deposited beforehand on the article. More precisely, the powder of the invention is a blend of polyamide on the one hand, and silver ions encapsulated in a soluble ceramic on the other.

BACKGROUND OF THE INVENTION

Currently, there are several industrial methods for covering an article by the melting of a polymer.

The first method is electrostatic powder coating, which consists in charging the powder with static electricity and bringing it into contact with the article to be covered, connected to zero potential. For example, the powder is injected in an electrostatic spray gun that charges the said powder by the corona effect, by triboelectrification or by a combination of both these. The powder thus charged is sprayed onto the article to be covered, which is connected to zero potential. According to another form of electrostatic powder coating, the article connected to zero potential is dipped in a fluidized bed of charged powder. Inside the bed is powder with which it is desired to cover the article. This powder is in the form of solid particles of small size, for example between 0.01 and 1 mm, of any shape, which are in a state of fluidization inside the bed owing to the presence of air or any other gas. The powder may be charged by electrodes, by the corona effect or by any device placed inside and/or outside the fluidized bed, in order to charge the powder by the triboelectric effect. The article covered with powder is then placed in an oven at a temperature high enough to provide a coating, by the powder melting and causing a film to form. For example, for a nylon-11 powder, it is sufficient to heat to 220° C.

The second method consists in preheating the article to be covered to a temperature above the melting point of the powder. Once hot, the article is immediately immersed in a fluidized bed of the powder, the powder melts on contact with the hot article and a film forms. A solid coating is thus provided. This method is also called "fluidized-bed dip coating". As a variant of this last method, the powder can be sprayed onto the hot article.

The powder paint of the present invention is useful in both processes.

The invention relates to the field of high-performance coatings. The purpose of these is generally to provide the protected surface with many properties, whether they be for appearance or for providing a function (corrosion, abrasion, chemical, heat and UV resistance, low coefficient of friction, etc.).

Bacteria are single-cell organisms that reproduce by division. They are a few microns in size. There are thousands of species of bacteria, approximately 200 of which are pathogenic for humans. A distinction is made between Gram+ bacteria such as *Staphylococcus aureus* and Gram− bacteria such as *Escherichia coli, Pseudomonas aeruginosa* and *Legionella* sp.

Bacteria are transmitted through the air or by contact with the surface of articles. Transmission occurs in particular in public places, on means of public transport and in hospitals (nosocomial diseases). One way of combating these microorganisms is to protect surfaces from the appearance or growth of bacteria. This is generally done by using detergents. However, experience shows that repeated cleaning does not prevent many infections in hospitals. By obtaining antibacterial coatings it should be possible to keep surfaces clean between two cleaning operations and therefore to minimize the risks of contamination.

The incorporation of organic biocides into coatings makes it possible to obtain surfaces that are effective against bacteria of the Gram+ and Gram− type (Patent Application WO 97/46626). In most cases, the biocides used are of organic type. Their inferior thermal stability at 300° C. prevents them from withstanding the very severe conditions associated with the processing of polyamides. In addition, since their activity is obtained by migration of the biocide through the polymer, this rapidly decreases over time.

A new generation of inorganic biocides have been introduced. These compounds are primarily supports of the zeolite, glass or ceramic type or silver-exchange zirconium phosphate complexes. In the presence of moisture, ion exchange takes place, which releases silver ions that are powerful biocides. Their introduction into polymers so as to obtain powder coatings having antibacterial properties has been disclosed in the prior art (U.S. Pat. No. 6,432,416 and Patent Application JP 06025561 A). This type of biocide does not migrate, which guarantees that the surface has antibacterial properties throughout the life of the polymer. It is known that these products can be used in many applications, such as for example refrigerator shelves (Patent Application WO 02/40180) or grilles used in cooking (Patent Application WO 00/51429).

However, since silver ions are very reactive, this type of biocide may easily interact with the polymers to which they have been added and also with the additives and fillers possibly contained in these polymers, and cause discoloration problems. It is therefore very important for them to be perfectly stabilized. It is the nature of the inorganic support that fulfils this role, and which protects the silver species from the action of temperature or UV light. It also controls the rate of release of the silver ions. This rate must be high enough to ensure antibacterial activity that is effective but controlled, so as to avoid the release of silver into the polymer matrix and therefore the resulting interactions. In the case of polyamide-based powder paints, the processing temperatures, especially when they are applied by dipping, make the choice of biocide very difficult. Most inorganic compounds (silver-exchanged zeolites or silver-exchanged zirconium phosphates, for example) result in substantial and undesirable colour changes on the surface. Patent Application WO 01/90259 discloses an antibacterial powder paint composition based on PA11 and on a mixed compound based on silver and zinc that does not have discoloration problems, the zinc compound very probably acting as a sacrificial anode.

It is now been discovered that it is much simpler and more effective to add silver ions encapsulated in a soluble ceramic to the polyamide powder. These silver ions encapsulated in a soluble ceramic are in the form of powder and all that is required is to dry blend it with the polyamide powder before producing the coating. Such powders have been disclosed, for example, in Patent Application JP 2001247726A. These powders are commercially available, sold by Sanitized AG under the name SANITIZED® BC A 21-41.

SUMMARY OF THE INVENTION

The present invention relates to the use of a powder for coating articles, this powder comprising, by weight, 99.8 to 97% of at least one polyamide and 0.2 to 3% of a soluble ceramic in which silver ions are encapsulated.

This powder may be prepared by simple dry blending of the constituents.

The invention also relates to this powder. Thus, the invention relates to a powder comprising, by weight, 99.8 to 97% of at least one polyamide and 0.2 to 3% of a soluble ceramic in which silver ions are encapsulated.

The ceramic protects the Ag ions from the temperature during application and use of the product, from UV radiation and from the other components present in the formulation. It is the presence of moisture on the surface of the coating, necessary for bacteria to grow, which releases silver ions and therefore eliminates the bacteria.

The present invention also relates to a method of covering an article with a film formed from the melting of a thin layer of powder, in which method:
  a) the above powder is used in electrified form, this powder having been charged by any means;
  b) the article is brought towards the powder or else the article and the powder are brought into contact with each other, the article being connected to zero potential or a potential sufficient to cover it with powder; and
  c) the powder-covered article is then placed in an oven at a temperature high enough to obtain the coating film by the polymer melting.

The present invention also relates to a method of covering an article with a film formed from the melting of a thin layer of powder, in which method:
  a) the above powder is used in fluidized bed form;
  b) the article to be covered is heated to a temperature high enough for the powder to melt on contact with it;
  c) the article is dipped into the fluidized bed for a time long enough for it to be covered with powder; and
  d) the article is withdrawn from the fluidized bed. Advantageously, it is this method that is used.

The present invention also relates to a method of covering an article with a film formed from the melting of a thin layer of powder, in which method:
  a) the above powder is used;
  b) the article to be covered is heated to a temperature high enough for the powder to melt on contact with it; and
  c) the powder is sprayed onto the article so that it is covered with powder.

The invention also relates to articles having an antibacterial coating obtained by the use of the above powders.

The invention described above has many advantages. The polyamide powder paint composition applied to a metal surface, either by electrostatic powder coating or by fluidized-bed dip coating or by hot spraying, gives it lasting antibacterial properties. This composition contains an inorganic biocide using silver ions as the only metallic species. This powder paint has the advantage of being able to be applied at temperatures above 300° C. without undesirable discoloration problems and without the use of zinc compounds. The side reactions caused by the silver species are therefore avoided by choosing an encapsulation in a soluble ceramic that effectively protects the silver ions from temperature and UV light, but also the other components of the formulation.

This invention allows the use of an inorganic biocide based on only silver in a polyamide powder coating that can be applied at temperatures above 300° C. without undesirable surface discoloration problems. Since silver ions are the metallic species that has the highest effectiveness and therefore the lowest MIC (minimum inhibition concentration), they guarantee optimum activity in the coating throughout the life of the polymer. In addition, this composition precludes interactions that may occur between the polymer chain and the zinc compounds when the latter are blended with the polyamide.

DETAILED DESCRIPTION OF THE INVENTION

With regard to the soluble ceramic in which silver ions are encapsulated, as example, glass oxides can be cited. This category encompasses the various chemical substances manufactured in the production of inorganic glasses. For purposes of this category, "glass" is defined as an amorphous, inorganic, transparent, translucent or opaque material traditionally formed by fusion of sources of silica with a flux, such as an alkali-metal carbonate, boron oxide, etc. and a stabilizer, into a mass which is cooled to a rigid condition without crystallization in the case of transparent or liquid-phase separated glass or with controlled crystallization in the case of glass-ceramics. The category consists of the various chemical substances, other than by-products or impurities, which are formed during the production of various glasses and concurrently incorporated into a glass mixture. All glasses contain one or more of these substances, but few, if any, contain all of them. The elements listed below are principally present as components of oxide systems but some may also be present as halides or chalcogenides, in multiple oxidation states, or in more complex compounds. Trace amounts of other oxides or chemical compounds may be present. Oxides of the first seven elements listed* comprise more than 95 percent, by weight, of the glass produced: Aluminum*; Boron*; Calcium*; Magnesium*; Potassium*; Silicon*; Sodium*; Antimony; Arsenic; Barium; Bismuth; Cadmium; Carbon; Cerium; Cesium; Chromium; Cobalt; Copper; Germanium; Gold; Holmium; Iron; Lanthanum; Lead; Lithium; Manganese; Molybdenum; Neodymium; Nickel; Niobium; Nitrogen; Phosphorus; Praseodymium; Rubidium; Selenium; Silver; Strontium; Sulfur; Tellurium; Tin; Titanium; Tungsten; Uranium; Vanadium; Zinc; Zirconium.

Soluble ceramic in which silver ions are encapsulated have been disclosed, for example, in Patent Application JP 2001247726A. These powders are commercially available, sold by Sanitized AG under the name SANITIZED® BC A 21-41 (CAS REGISTRY NUMBER: 65997-17-3 EfNECS No. 266-046-0).

With regard to the polyamide, the term "polyamide" is understood to mean products resulting from the condensation:
  of one or more amino acids, such as aminocaproic, 7-aminoheptanoic, 11-amino undecanoic and 12-aminododecanoic acids, or of one or more lactams, such as caprolactam, oenantholactam and lauryllactam;
  of one or more salts or mixtures of diamines, such as hexamethylenediamine, dodecamethylenediamine, metaxylylenediamine, bis(p-aminocyclohexyl)methane and trimethylhexamethylenediamine with diacids such as isophthalic, terephthalic, adipic, azelaic, suberic, sebacic and dodecanedicarboxylic acids; or mixtures of several of these monomers, resulting on copolyamides. Advantageously, aliphatic polyamides are used.

The aliphatic polyamides may be chosen from PA-11, PA-12, aliphatic polyamides resulting from the condensation of an aliphatic diamine having from 6 to 12 carbon atoms and of an aliphatic diacid having from 9 to 12 carbon atoms, and 11/12 copolyamides having either more than 90% of 11 units or more than 90% of 12 units.

As examples of aliphatic polyamides resulting from the condensation of an aliphatic diamine having from 6 to 12 carbon atoms and of an aliphatic diacid having from 9 to 12 carbon atoms, mention may be made of:

PA-6,12 resulting from the condensation of hexamethylenediamine and 1,12-dodecanedioic acid;
PA-9,12 resulting from the condensation of the C9 diamine and 1,12-dodecanedioic acid;
PA-10,10 resulting from the condensation of the C10 diamine and 1,10-decanedioic acid;
PA-10,12 resulting from the condensation of the C9 diamine and 1,12-dodecanedioic acid.

As regards 11/12 copolyamides having either more than 90% of 11 units or more than 90% of 12 units, these result from the condensation of 1-aminoundecanoic acid with lauryllactam (or the $C_{12}$ α,Ωamino acid).

Advantageously, PA-11 and PA12 are used.

With regard to the preparation of the powder, this may be carried out by simple dry blending of the constituents. The polyamide powder has a particle size that may vary from 10 to 1000 μm. The expression "dry blending" is used as opposed to blending in which the thermoplastic polymer is in the melt state. Standard blenders for powder products may be used, for example a Henschel® mixer. The blending is carried out at standard temperature and pressure. The blending time must be long enough for the blend to be homogeneous.

The silver ions in the soluble ceramic may be present in any proportion provided that there are enough silver ions to obtain an antibacterial effect. This is advantageously between 1 and 10%, preferably between 3 and 6%, by weight.

Advantageously, this powder comprises, by weight, 99.5 to 99% of at least one polyamide and 0.5 to 1% of a soluble ceramic in which silver ions are encapsulated.

The concentration is preferably around 0.6%. It may be less, but in this case the expected effectiveness on all targeted bacteria is not found. The proportion of antimicrobial agent is not necessarily 0.6%. It is chosen so as to obtain a compromise between effectiveness and cost of the product. It has also been determined so as to minimize the risks that release of the composition into an aquatic environment could entail.

The powder of the invention may also include UV stabilizers, antioxidants, dyes, pigments, fire retardants, etc. These products are preferably incorporated into the polyamide before it is reduced to powder.

With regard to the articles that it is desired to coat, mention may be made by way of example of metal articles. As examples of metals, mentioned may be made of aluminium, aluminium alloys, steel and its alloys. Optionally, a surface pretreatment is carried out on the article before it is covered with powder. These are conventional pretreatments used in the coating industry, namely phosphatizing, degreasing, shot peening. A primer may also be used.

The invention also relates to this powder. The composition of this powder, the nature and the proportions of its constituents are those described above for its use.

With regard to antibacterial tests, this composition is applied to steel plates which, beforehand, have been degreased, shot-peened and coated with an adhesion primer. The application may be carried out either by electrostatic spraying or by hot spraying or by fluidized-bed dip coating.

The colorimetric coordinates of the coatings obtained are then measured by means of a spectrocolorimeter and compared with those of the corresponding commercial grade (that is to say polyamide powder with its additives, but not containing the antibacterial agent). The results show little or no colour change between the commercial grade and the grade with the antibacterial agent added, something which cannot be obtained (see the examples) when the silver-containing support is a zeolite or a zirconium phosphate.

The mechanical properties and the ability to withstand various aging treatments have been verified. The tests carried out show no difference in properties, other than the biological difference between the commercial grade and the grade with the agent added.

The antibacterial properties are evaluated according to the JIS Z 2801-2000 standard, amended so as to make handling easier. The exact protocol is described below.

a—Preparation of The Inoculum

At 4.0 pm, on the day before, seed 200 ml of liquid culture medium (1 g of beef extract, 2 g of yeast extract, 5 g of peptone, 5 g of NaCl and 1 l of ultrapure water) with a strain of *Escherichia coli* coming from a minimum of a 2nd subculturing on inclined agar. The same protocol may be applied in the case of the *Staphylococcus aureus* or *Legionella pneumophila* strains. To do this, the inclined tube of agar is rinsed with 5 ml of liquid culture medium and well vortexed, the contents of the tube being drained into a 200 ml flask of sterile culture medium. The inoculum is then left in an incubator at room temperature and with no stirring over night. Stirring and heating is programmed to begin the next morning at 5.00 am. During the day, the sample is left to grow in a stirred incubator at 37° C. for about 4 h, so as to be in the exponential growth phase, the start of the tests therefore taking place around 9.00 am in the morning.

b—Preparation of the Steel Plates Coated with the Antibacterial Polyamide

Wash the plates with 70° ethanol, then leave them to dry under the hood and prevent any contact between the cleaned surface to be tested and non-sterile equipment.

c—Inoculation

Stick the Gene Frame cells (polyethylene sheets whose borders are self-adhesive so as to adhere to the substrate) to the steel plates coated with the antibacterial polyamide to be tested in an amount of two cells per plate for better handling reproducibility. Dilute the initial bacterial suspension (stock solution) ten-fold in sterile physiological saline and vortex well. Put 100 μl of the ten-fold diluted solution in the frames of the Gene Frame cells and close with the cover slip. Incubate for 24 hours in an oven at 37° C.

d—Inoculum Counting

Prepare four tubes to $10^{-2}$, $10^{-4}$, $10^{-6}$ and $10^{-8}$ dilutions using the ten-fold diluted stock solution. Keep the $10^{-2}$ and $10^{-4}$ dilution tubes in a cool place should there be a problem. Place the $10^{-6}$ and $10^{-8}$ dilutions in Millipore total count slides for counting colonies and incubate for 24 hours in an oven at 37° C.

After incubating the Rilsan®-coated plates for 24 h, remove all the available inoculum from the Gene Frame cells and transvase it into a sterile Eppendorf tube. Pipette 50 μl of this solution and dilute it in 5 ml of sterile physiological saline ($10^{-2}$ dilution). Next, carry out a cascade dilution ($10^{-4}$, $10^{-6}$) in 10 ml of sterile physiological saline. Place the various dilutions ($10^{-2}$, $10^{-4}$ and $10^{-6}$) in the Millipore total count slides for counting colonies and incubate for 24 hours in an oven at 37° C.

The antibacterial results obtained on *Escherichia coli*, *Staphylococcus aureus* and *Legionella pneumophila* show reductions in the bacterial population of greater than 99.99% on the coatings obtained from the compositions produced according to the present invention.

EXAMPLES

The following examples illustrate the invention without limiting its scope.

Example 1

Evaluation of the Antibacterial Effectiveness of a Composition as Described in this Invention 0.6% of SANITIZED BC A 21-41 was dry-blend incorporated into a 3362 grey T commercial RILSAN® (based on PA-11) using a high-speed Henschel mixer so as to obtain a composition A.

The powder composition A obtained and the MAC 3362 grey T commercial grade were applied by dip coating. This process consisted in degreasing and shot-peening a steel plate and coating it by air-spraying an epoxy-type adhesion primer, then preheating the plate to a temperature of 300° C. The test piece thus prepared was immersed in a tank containing powder that was to be applied by fluidization.

The coating A and the coating without the additive were of perfectly similar appearance. Their antibacterial properties were evaluated according to the protocol described above. The results are summarized in the table below:

TABLE 1

| | E. coli | | | S. aureus | | | L. pneumophila | | |
|---|---|---|---|---|---|---|---|---|---|
| Composition | t = 0 (log of CFU/ml) | t = 24 (log of CFU/ml) | Reduction in % | t = 0 (log of CFU/ml) | t = 24 (log of CFU/ml) | Reduction in % | t = 0 (log of CFU/ml) | t = 24 (log of CFU/ml) | Reduction in % |
| 3362 MAC GREY T | 7.7 | 7.9 | — | 7.5 | 71 | — | 6.7 | 6.3 | — |
| A | 8 | 2.7 | >99.999 | 7.3 | <2 | >99.999 | 6.7 | 2 | >99.998 |

The coating obtained from the patented composition was highly effective, reducing the bacterial population by more than 99.99% in the case of *E. coli*, *S. aureus* and *L. pneumophila* strains.

Example 2

Comparative Evaluation of the Discoloration Induced by Incorporation of an Antimicrobial Agent Three compositions, B, C and D, were produced by dry-blend incorporating, respectively, 0.6% of SANITIZED BC A 21-41, 0.6% of AGION AK10D (silver-exchanged zeolite) and 0.6% ALPHASAN RC5000 (silver-exchanged zirconium phosphate) into an 840 white ES grade (PA-11 powder). The compositions B, C and D and the 840 white ES commercial grade were applied by the electrostatic method. This method consisted in degreasing, shot-peening and coating a steel plate with an epoxy-type adhesion primer by air-spraying. The powder that had to be applied was positively charged in a corona-discharge gun so as to be sprayed onto the earthed test piece prepared as described above. The colorimetric coordinates (CIE Lab 76 (L*,a*,b*) system; $D_{65}$ illuminant; 10° viewing angle) were measured using a Hunterlab COLORQUEST integrating-sphere spectrocolorimeter. The colorimetric differences with respect to the control are given in TABLE 2 below.

TABLE 2

| Composition | $\Delta E^*$, ($D_{65}$ ILL.; 10°) |
|---|---|
| 840 white ES | — |
| C (0.6% AGION AK 10 D) | 8.46 |
| B (0.6% SANITIZED) | 2.11 |
| D (0.6% RC 5000) | 11.69 |

The coating corresponding to composition B obtained with the SANITIZED AG product (a ceramic containing silver ions) exhibited a very small colorimetric change compared with the products obtained from either the silver-exchange zeolite or the silver-exchanged zirconium phosphate.

What is claimed is:

1. Method of covering a metal article with a film formed from the melting of a thin layer of powder comprising:
    a) physically blending 99.8 to 97% by weight of at least one polyamide and 0.2 to 3% by weight of an inorganic biocide species consisting of a soluble ceramic in which silver ions are encapsulated to form a powder blend composition;
    b) contacting said metal article with said powder composition blend to form a thin layer of said powder on the article;
    c) melting said powder blend composition onto said metal article to form a thin coating film;
    d) cooling said coated article;
    wherein said powder blend composition is free of zinc compounds, wherein said method provides a coating having antibacterial properties and does not cause discoloration.

2. The method of claim 1, wherein said step b) involves connecting said article to zero potential or a potential sufficient to cover it with powder; and step c) involves placing the powder-covered article in an oven at a temperature high enough to melt the thin layer of powder to obtain a coating film.

3. The method of claim 1, wherein said steps b) and c) involve placing
    said powder composition blend in a fluidized bed, heating the article to be covered to a temperature high enough for the powder to melt on contact with it, and dipping the article into the fluidized bed for a time long enough for it to be covered with the powder blend composition, said powder blend composition melting shortly after contact with said heated article; and said cooling occurs upon withdrawing the article from the fluidized bed.

4. The method of claim 1, wherein said steps b) and c) involve heating the article to be covered to a temperature high enough for the powder to melt on contact with it; and spraying the powder onto the article so that it is covered with powder.

5. The method of claim 1, wherein said powder blend composition is heated to a temperature of greater than 300° C.

6. The method of claim 1, wherein said inorganic biocide species contains silver ions as the only metallic species.

7. The method of claim 1 wherein the polyamide is chosen from PA-11 and PA-12.

8. The method of claim 1 wherein the powder comprises, by weight, 99.5 to 99% of at least one polyamide and 0.5 to 1% of a soluble ceramic in which silver ions are encapsulated.

9. The method of claim 1 wherein the proportion of silver ions in the ceramic is between 1 and 10% by weight.

10. The method of claim 1 wherein the proportion of silver ions in the ceramic is between 3 and 6% by weight.

* * * * *